Dec. 27, 1955 M. POPE 2,728,831
ELECTRIC HYGROMETER
Filed Nov. 9, 1951

MARTIN POPE
INVENTOR.

United States Patent Office 2,728,831
Patented Dec. 27, 1955

2,728,831

ELECTRIC HYGROMETER

Martin Pope, Brooklyn, N. Y., assignor to Phys-Chemical Research Corp., New York County, N. Y., a corporation of New York Application November 9, 1951, Serial No. 255,596

18 Claims. (Cl. 201—63)

The present invention relates to humidity sensitive elements and more particularly to an element which responds to changes in humidity by changing its electrical resistance, thereby being capable of acting as the sensing element of an electric hygrometer circuit.

Presently, the most widely used humidity sensing element, aside from mechanically operated means, is the element developed by Dunmore (U. S. Patents Nos. 2,285,421 and 2,295,570). Dunmore disclosed an element which consisted of an insulating member superimposed upon the surface of which was a thin coating of a hygroscopic salt (typically, lithium chloride), the electrical resistance of which varied with relative humidity.

However, Dunmore's element is subject to several disadvantages, the most serious of which include the inability of the element to operate in or service high temperatures and the permanent change in the humidity-response characteristic of such element after being immersed in water, exposed to steam or subjected to high humidities in the course of which droplets may be formed thereon. Such a change in response results in a ruined element or, at best, one which is useless unless recalibrated.

An object of the instant invention is to provide a humidity sensitive element, suitable for employment as the sensing element of an electric hygrometer which will function over a wide range of humidity and temperature and survive exposure to extremes of such conditions.

Another object is the provision of such an element which will combine mechanical stability and simplicity of manufacture.

These and other objects are achieved by an element consisting of a base or substrate of an electrically-insulating, highly-cross linked, organic polymer, a thin surface layer of which has been treated to present an ion-exchange area, the stationary polar groups in such area comprising an integral part of the underlying polymeric matrix. In effect the element acts as a surface ion exchanger as distinguished from a bulk ion exchanger. The thin surface layer, when exposed to water vapor takes up water rapidly, reaching equilibrium within a minute. Mobile ions freed upon the intake of water furnish the means for electrolytic conduction when a voltage is impressed across a portion of said ion exchange surface layer. Since the conductivity of the element varies as a function of the water vapor pressure of the atmosphere to which it is exposed, it may be used as a humidity sensing element.

The foregoing is intended only to generally explain the subject invention without limiting it in any manner.

Other objects and a fuller understanding of the invention may be had by referring to the following explanations and description, taken in conjunction with the accompanying drawings wherein.

Figure 2:
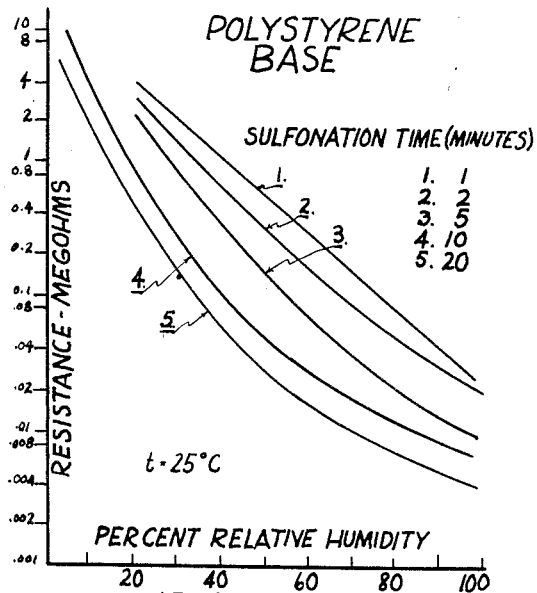
Fig. 2 is a graph illustrating a family of curves representing the resistance-relative humidity characteristic of elements with a styrene-divinylbenzene copolymer base (hereafter referred to as polystyrene) sulfonated for the times indicated.

Since the principles underlying the operation of the subject invention are derived from the properties of solutions of electrolytes and of ion exchange resins, a brief description of the relevant features of these two systems is in order.

Electrolytic conduction

Aqueous solutions of electrolytes (acids, bases, salts), like metallic conductors, obey Ohm's law except at very high voltages or with high frequency currents. Where in metallic conductors, the flow of electrons constitutes the current, the flow of ions comprises the current in solutions of electrolytes. Just as in metals where the specific conductivity is a function of the nature of the metal, the conductivity of aqueous solutions electrolytes depends on the electrolyte used. Generally speaking, solutions of the strong acids like hydrochloric, nitric and sulfuric acids, and strong bases like sodium hydroxide and potassium hydroxide display much higher conductivities than solutions of other electrolytes of identical concentration. This is due in most part to the high conductivity of the hydrogen and hydroxyl ions, which are present in acids and bases, respectively. Electrolytic conductivity also depends on the concentration of the electrolyte. The exact relationship between conductivity and concentration has been developed only for relatively dilute solutions. Here it has been observed that as the concentration of the solution increases, the conductivity decreases. In the cases of the acids and bases mentioned above, the conductivity does not decrease continuously with increasing concentration, but reverses itself with concentration.

Generally speaking, the conductivity of electrolytes in dilute solutions, and in moderately concentrated solutions of strong electrolytes increases as the temperature is increased. However, conductivity of electrolytes as a function of temperature has not been well studied at very high concentrations.

Ion exchange resins

In brief, a conventional ion exchange resin consists of a high polymeric, cross-linked structure containing as an integral part of its structure, and throughout such structure, polar groups of positive or negative charge (anion and cation exchangers, respectively). Such an ion exchange resin is termed herein a bulk ion exchanger. Associated with these polar groups are ions of an opposite charge which are held by electrostatic forces to the fixed polar groups. Upon the uptake of water these mobile ions furnish the means for electrolytic conduction when a voltage is impressed across a portion of the exchanger. As an example, a sulfonic acid type of cation ion exchanger will be described. Styrene may be polymerized in the presence of divinyl-benzene to give a hard, highly cross-linked polystyrene. This polystyrene may be sulfonated by a suitable technique (cf. "Ion Exchange Resins"—R. Kunin and R. J. Myers, Wiley and Sons, N. Y., 1950, p. 54), as a result of which the sulfonic acid radical is made a part of the polymeric matrix. The negative portion of the sulfonic acid radical (anion) is an integral part of the highly insoluble resin, while the positive portion, or hydrogen ion, is bound by electrostatic attraction to the anion. Since the hydrogen ion is held by electrostatic forces, any cation which will satisfy the condition that the resin be electrically neutral can take the place of, or exchange with, the hydrogen ion. It is this property which gives the resins their name.

The polar groups which are a part of the resin may be sulfonic, carboxylic, phenolic, or phosphonic groups, and they demonstrate their individual ionic character in a manner which is to large extent independent of the non-polar portion of the resin structure. Thus, the sulfonic acids are strong acids and are highly ionized, while the phenols and carboxylic acid groups are weak acids and are poorly ionized.

The same general behavior is observed in the case of anion exchangers. In this system, the resin has incorporated in its structure an amine, or substituted amine group. This group will react with an acid in solution in a manner shown below:

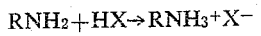

$$RNH_2 + HX \rightarrow RNH_3^+ X^-$$

Here, R denotes the resin matrix, and HX denotes an acid with X representing the exchangeable anion. In a strongly basic resin of the quaternary ammonium type, the ionization of the hydroxyl ion is strong, while in a weak base resin, the ionization of the hydroxyl ion is very low.

Both anion and cation bulk exchange resins are porous hygroscopic gels which swell strongly as water is taken up. It has been shown that the volume of a definite weight of resin is uniquely determined by the relative humidity, if time is allowed to reach equilibrium. The volume of a given quantity of resin in a given ionic state is determined by the amount of water taken up. The movement of water inside the resin structure is essentially a diffusion process, and is a time consuming step. For this reason, a bulk ion exchange resin will not quickly attain its equilibrium water uptake.

Since these ion exchange resins maintain exchangeable anions or cations, they are capable of electrolytic conduction.

*The subject humidity sensitive element*

With the above introduction, the behavior of the subject humidity sensitive element may be easily understood. The element is essentially a thin layer of an ion exchanger formed at the surface of, and being an integral part of, a thermally stable organic non-conductor. The sole difference between the molecules in the surface layer and those in the interior is that the surface molecules contain polar constituents. Otherwise, the bonding between the surface molecules and the interior is unchanged. A material evidencing such ion exchange characteristics only at and in the vicinity of the surface, is here termed a surface ion exchanger. This surface layer has the properties of the bulk ion exchanger, such as hygroscopicity, insolubility in water, excellent thermal stability, ion exchange capacity, and electrical conductivity. However, being a thin layer, its uptake of water is very rapid, equilibrium being reached within a minute.

The employment of the thin surface layer of ion exchange material marks a radical departure from the main stream of development of uses for ion exchange resins. Thus, in adapting bulk ion exchangers for commercial use, the effort has been made to obtain the greatest efficiency in ion exchange capacity by achieving the maximum ion exchange per unit of volume of the exchanger. Here, however, by reversing the conventional approach and making use of a very small part of the entire crystal lattice, preventing the diffusion of ions throughout the structure and limiting such diffusion to a small surface layer, an entirely new type of element is obtained.

The substrate of this humidity sensitive layer must be a non-conductor, else the electrical conductivity changes of the surface film would be masked. The mobile ions in the ion exchange surface may be any cation in the case of a cation exchange resin. However, the conductivity of the surface will vary, depending on the cation used. The hydrogen, sodium, lithium and potassium ions provide practical ranges of conductivity for normal use in hygrometric instrumentation. When used with sulfonic and phosphonic acid ion exchange surfaces, the hydrogen ion provides a higher conductivity than the other said ions. For the sake of simplicity in explanation, the ion exchange surface will be assumed to be cationic, and in the hydrogen state, although any other cationic state would behave qualitatively in the same manner.

The conductivity of the hydrogen ions on the surface of the humidity sensitive element depends on four factors:

1. *Ionic concentration.*—All other factors being equal the greater the number of polar groups per unit of area of surface, the greater will be the conductivity.

2. *Relative humidity.*—At any given relative humidity and temperature, the water uptake of the ion exchange surface will be a constant. The conductivity of the hydrogen ions will vary as the concentration of water in the surface layer, becoming higher as the relative humidity increases.

3. *Temperature at the surface of the element.*—As was indicated above, the conductivity of a given solution of an electrolyte will generally vary with temperature. The same behavior is noted in the ion exchange layer.

4. *Surface area between the electrodes.*—The element may be made in any shape. The electrodes are applied to convenient portions of the element, and the conductivity of the ion exchange surface is measured between these electrodes.

There are two general methods of synthesizing an ion exchange resin. Method I consists of building the ionic groups into the resin structure during the polymerization. This requires that the ionic groups be an integral part of the monomer component. In method II, the ionic groups are introduced into an already polymerized material. The latter method of producing an ion exchange resin is the method which is employed to produce the efficient humidity sensitive surface described herein. In the first method, the ionic groups are uniformly distributed throughout the polymer, which is consequently porous. The equilibration of such a bulk ion exchange resin with water vapor is a lengthy process, requiring many hours for completion. In method II, the production of ion exchange material may be halted at any point, thus limiting the depth and surface concentration of the ion exchange groups. In this manner, it becomes possible to produce the thin ion exchange layer (surface ion exchange layer) which will attain equilibrium with the atmosphere very quickly. The polar groups to be introduced may be sulfonic, carboxylic, and phosphonic. It is to be borne in mind, however, that the conductivity will be highest in the strongest acid groups.

To illustrate more fully the novel concepts set forth above, the manufacture of a few types of humidity sensitive elements will be described.

The elements are preferably cylindrical and 1¼ inches long by 7/16 inch in diameter. These dimensions are quite arbitrary, and any convenient form may be chosen.

The elements may consist of either treated cross-linked phenol formaldehyde, resorcinol formaldehyde, phenol furfural, cresol formaldehyde, xylenolformaldehyde, divinylbenzene-polystyrene copolymer, or any organic high polymeric cross-linked material which is capable of being made into a surface ion exchanger by method II previously described.

For the illustrative example of the technique used to create a humidity sensitive surface, the divinylbenzene polystyrene copolymer may be used. The particular commercially available copolymer here employed may be described as a thermoset plastic resulting from the copolymerization of vinyl benzene and ethylvinylbenzene, divinylbenzene being used as the cross linking agent in amount of between 3 and 6 percent. To create an ion exchange surface of the sulfonic acid type, a rod of the desired dimensions of such polystyrene is first submerged in concentrated sulfunic acid, at 100° C., using 0.5% dry weight silver sulfate as a catalyst. The time of sulfonation may be varied from one minute to sixty minutes, depending upon the conductivity desired at a given relative humidity. If such sulfonation is permitted to proceed for more than one hour the surface of the rod becomes seriously affected, and substantially no greater conductivity is manifested. Such excessive sulfonation leads to greater penetration of the rod with a consequent increase in equilibrium time. As pointed out above, the movement of water inside a resin structure is essentially a diffusion process. The greater the depth water must reach, the longer it takes to achieve water uptake equilibrium. On the other hand, such sulfonation for appreciably less than a minute results in an element which has such high resistance as to require laboratory procedures to measure currents passing therethrough, especially at the lower humidities. Hence a minute of sulfonation constitutes a lower practical level.

Other methods of sulfonation such as the use of sulfur trioxide, or chlorsulfonic acid are just as satisfactory. After the sulfonation, the elements are rinsed with water, and boiled in dilute sulfuric acid for an hour to insure the hydrogen state of the ion exchange surface, as well as to clean the surface of any water soluble material. A final rinsing with distilled water, followed by air drying completes the chemical treatment.

If a different ionic state of the resin is required, such as the sodium state, the elements would be boiled in dilute sodium chloride, and rinsed with distilled water which contains a trace of sodium chloride.

The electrodes for these elements may be silver, gold, palladium or platinum and may be applied through the medium of a conductive metallic paint bearing these metals in powdered form, or they may be applied by such techniques as vacuum evaporation if the need arises.

Figure 1:
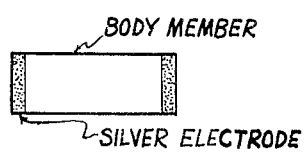
Fig. 1 is a side elevation of an element embodying features of the invention.

A type of electrode which is simple to apply in one of a conductive silver paint suitable for use on plastic. The ends of the element may be dipped into the silver paint, or the electrodes may be painted on. Fig. 1 illustrates an element having such electrodes. The electrodes may be simple rings, or interweaving spirals. The latter type of electrode is convenient when it is desired to increase the conductivity of the element. When an element having electrodes of the first type is physically incorporated in an instrument, it may be mounted in conventional open fuse mounts.

An element made by the above method will respond quickly to humidity changes, and its surface conductivity will vary in a smooth continuous fashion as the relative humidity changes from 3 percent to 100 percent. Fig. 2 illustrates how the resistance of five elements employing a polystyrene rod sulfonated for different times (in accordance with the procedure described above) varies as a function of the relative humidities in which they were placed, when the temperature was kept at a constant 25° C. Thus, curve 5 of Fig. 2 shows that the resistance of such an element, sulfonated for 20 minutes will vary from $6 \times 10^6$ ohms at 3% relative humidity to $4 \times 10^3$ ohms at 97% relative humidity. Similarly, curve 1 (element sulfonated for 1 minute) reveals a change in resistance from $4.5 \times 10^6$ ohms at 10% relative humidity to $2.6 \times 10^4$ ohms at 97% relative humidity. As may be verified from the data included in the curves of Fig. 2, by finely controlling sulfonation time elements may be made which are particularly suitable for a limited humidity range.

Figure 3:
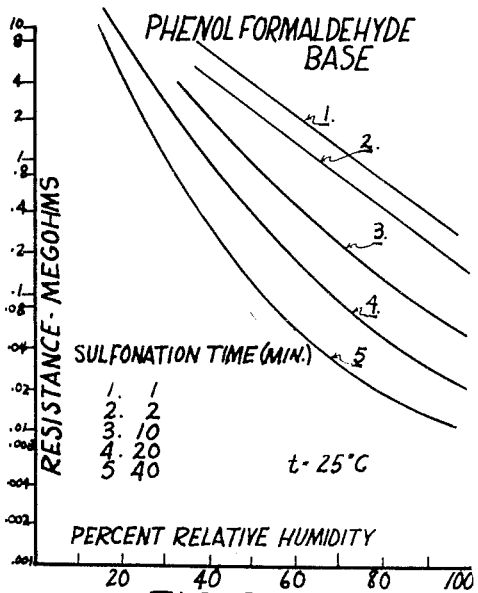
Fig. 3 is a similar graph for elements with a phenol-formaldehyde base.

Similarly, the effect of time of sulfonation upon the conductivity (plotted as its reciprocal resistance) at various relative humidities employing a phenolformaldehyde element (made by following the process described above) is set forth in Fig. 3. While the conductivity of these elements is somewhat lower than the polystyrene elements, the same general effect of increased conductivity with increased sulfonation time is evidenced.

Figure 4:
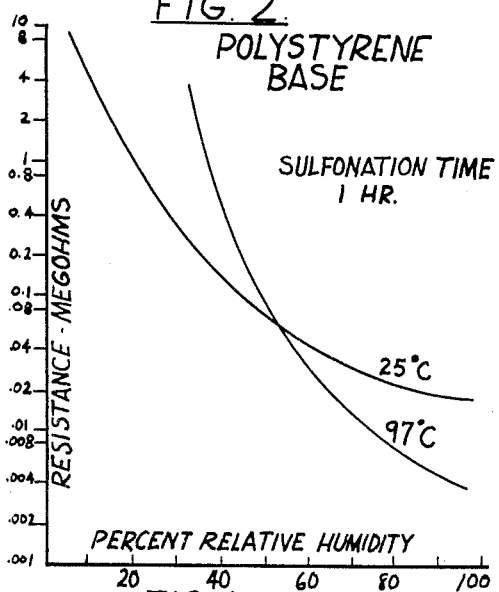
Fig. 4 is a graph illustrating the resistance-relative humidity response of a polystyrene element sulfonated for one hour, one curve being derived from observations taken at a temperature of 25° C. and the other at 97° C.

One of the most important consequences of using these highly cross-linked polymers as substrates for the ion exchange surface is that humidity measurements may be made at elevated temperatures. Thus, while the humidity sensitive elements described by Dunmore (supra) would lose their shape at about 80° C., the subject elements have been operated at 97° C. For example, the polystyrene element which had been sulfonated for one hour indicated a change in relative humidity from 33 to 98 percent as its resistance changed from $3 \times 10^6$ ohms to $4.3 \times 10^3$ ohms. See Fig. 4 which illustrates a pair of curves of the resistance-relative humidity characteristic of such an element, when the temperature is kept constant at 97° C. and at 25° C. This particular element is from a different batch of styrene from those which gave rise to the data for Fig. 2 and had been sulfonated for one hour.

Figure 5:
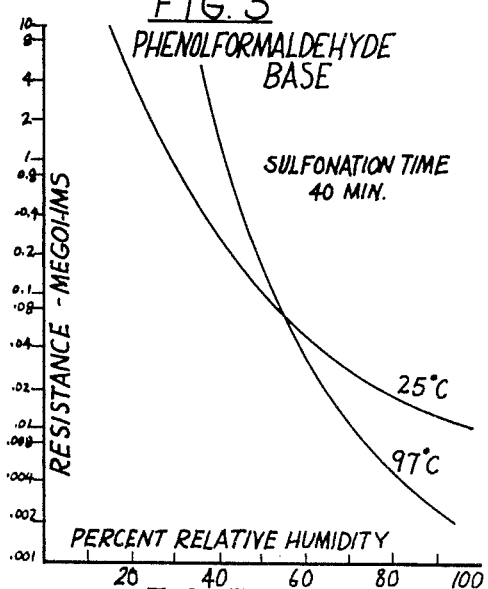
Fig. 5 is a similar graph for a phenol formaldehyde element sulfonated for forty minutes.

For a comparable pair of curves relating to elements made of a phenol formaldehyde base sulfonated for 40 minutes, see Fig. 5. Note the resemblance between the pairs of curves in Figs. 4 and 5. Although the resistance values are higher in the lower humidity ranges and lower in the higher humidity ranges in Fig. 5 (as compared with those in Fig. 6), the curves for the same thermal levels are similar and the relationships of the pairs are likewise similar. This points up the fact that the operation of the element, whether employing a polystyrene, phenol formaldehyde or other highly cross-linked polymer as a base, is essentially the same and results not from the nature of the underlying matrix, but from the nature of the surface ion exchange layer and more particularly from the nature of the bond between the fixed polar groups and the mobile ions. Of course, different polymers will require different sulfonation times to achieve surface ion exchange layers of comparable depth, but it requires no unusual techniques to establish such times for any particular polymer.

Whatever the surface ion exchanger used the elements represent a significant departure in that the elements themselves are insoluble, will not be affected by steam and will operate at temperatures as high as 100° C. In addition, they are mechanically rugged and need not be handled as delicately as must be most sensing elements.

The subject element may be employed in conventional electrical hygrometric circuits. For examples of a few circuits see Dunmore, U. S. Patents Nos. 2,285,421 and 2,295,570. Essentially, such circuits measure the electrical resistance (or its reciprocal, the conductance) of the sensing element. Either direct or alternating currents may be caused to flow through the elements. However, in most applications alternating voltages will be applied to the elements in order to neutralize polarization. When direct voltages are impressed, anti-polarization means must be employed or specific selections of combinations of electrodes and electrolytic conduction means must be made to minimize polarization.

It is obvious from the foregoing that many modifications may be made without departing from the invention as exemplified in the embodiments described.

Thus, while the element has been described as a rod, it may be in the form of a hollow cylinder, or other mechanical shape, or as taught by Dunmore (U. S. Patent No. 2,285,421) the polymer may be deposited upon a hollow metal cylinder in order to place the unit in better thermal communication with the surrounding atmosphere. When in the claims, mention is made of a "solid body member" such reference is made in order to distinguish the state from a liquid or gas and is not meant to exclude a hollow form or the like. Similarly, it would constitute no departure from the invention described to sulfonate only a portion of the surface of the body of said element. Nor would the invention be transcended if the body of said element be formed as a hollow tube and only the inner surface or a portion thereof be sulfonated or if said body have cavities, flutings, or other indentations therein and only the surface of such cavities, flutings or identations be sulfonated. When in the claims, mention is made of "the surface" of said body, reference is intended to an area in communication with the atmosphere in which said element is placed, which term includes the inside surface of a tube or the like as well as the surface of said cavities, flutings and indentations.

Although the subject invention has been described with a certain degree of particularity, it is understood that the present disclosure has been made only by way of example and that numerous additional changes in the details of construction, combination and arrangement may be resorted to without transcending the scope of the invention as hereinafter claimed.

What is claimed is:

1. A humidity sensitive element comprising a body member formed of a solid, electrically insulating cross-linked organic polymer, said body member having an ion exchange material only in a thin layer at the surface of said polymer and a plurality of spaced electrodes disposed thereon in electrical contact with said layer.

2. A humidity sensitive element comprising a body member formed of a solid, electrically insulating cross-linked organic polymer, said polymer having fixed polar groups annexed thereto by chemical bond only in a thin layer at the surface thereof, said groups having associated therewith ions of an opposite charge held thereto by electrostatic forces, which ions become mobile in the presence of water, whereby the electrical resistance between spaced points in said layer will vary directly as a function of the relative humidity in the atmosphere in which the element is placed and a plurality of spaced electrodes disposed thereon in electrical contact with said layer.

3. A humidity sensitive element comprising a body member formed of a solid, electrically insulating cross-linked organic polymer, said polymer having fixed polar groups united by chemical bond to the non-polar matrix of said polymer only in a thin layer at and in the close vicinity of the surface thereof, said groups having electrostatically annexed ions capable of movement in the presence of water, whereby the electrical resistance between spaced points in said layer will vary directly as a function of the relative humidity in the atmosphere in which the element is placed and a plurality of spaced electrodes disposed thereon in electrical contact with said layer.

4. A humidity sensitive element as described in claim 2, said polar groups being a group selected from the class consisting of sulfonic, carboxylic and phosphonic groups.

5. A humidity sensitive element as described in claim 2, said polymer being a material selected from the class consisting of cross-linked phenol formaldehyde, resorcinol formaldehyde, phenol furfural, cresol formaldehyde, xylenolformaldehyde and divinylbenzene-polystyrene copolymer.

6. A humidity sensitive element as described in claim 2, said ions being ions selected from a group consisting of hydrogen, sodium, lithium and potassium ions.

7. A humidity sensitive element comprising a body member formed of cross-linked material selected from the group consisting of cross-linked phenol formaldehyde, resorcinol formaldehyde, phenol furfural, cresol formaldehyde, xylenolformaldehyde and divinylbenzene-polystyrene copolymer, said material having fixed polar groups, selected from the class consisting of sulfonic, carboxylic and phosphonic groups, annexed thereto by chemical bond only in a thin layer at the surface thereof, said groups having associated therewith ions of an opposite charge held thereto by electrostatic forces, which ions become mobile in the presence of water, whereby the electrical resistance between spaced points in said layer will vary directly as a function of the relative humidity in the atmosphere in which the element is placed and a plurality of spaced electrodes disposed thereon in electrical contact with said layer.

8. A humidity sensitive element comprising a body member formed of cross-linked divinylbenzene-polystyrene copolymer having fixed sulfonic groups annexed thereto by chemical bond only in a thin layer at the surface thereof, said layer being in the hydrogen state and a plurality of spaced electrodes disposed thereon in electrical contact with said layer 9. A humidity sensitive element comprising a body member formed of cross-linked phenol formaldehyde having fixed sulfonic groups annexed thereto by chemical bond only in a thin layer at the surface thereof, said layer being in the hydrogen state and a plurality of spaced electrodes disposed thereon in electrical contact with said layer.

10. A humidity sensitive element comprising a body member formed of a solid, electrically insulating cross-linked organic polymer, said polymer having groups attached thereto only at and in the vicinity of the surface thereof, said groups being capable of providing free ions in the presence of water and a plurality of spaced electrodes disposed thereon in electrical contact with portions thereof having said attached groups.

11. A humidity sensitive element comprising a body member formed of a solid, electrically insulating cross-linked organic polymer, said polymer having a surface layer substantially similar in free ion contributing properties in the presence of water as the surface layer produced by subjecting said body member to the action of concentrated sulfuric acid at substantially 100° C. in the presence of .5% silver sulfate by weight for substantially from 1 to 60 minutes and a plurality of spaced electrodes disposed thereon in electrical contact with said layer.

12. A humidity sensitive element as described in claim 2, said polar groups being negative ionic groups.

13. A humidity sensitive element as described in claim 3, said polar groups being negative ionic groups.

14. A humidity sensitive element as described in claim 13, said polar groups being a group selected from the class consisting of sulfonic, carboxylic and phosphonic groups.

15. A humidity sensitive element as described in claim 13, said ions being ions selected from a group consisting of hydrogen, sodium, lithium and potassium ions.

16. A humidity sensitive element comprising a body member formed of a solid, electrically insulating cross-linked organic polymer, said polymer having negative groups attached thereto only at and in the vicinity of the surface thereof, said groups being capable of providing free ions in the presence of water, and a plurality of spaced electrodes disposed thereon in electrical contact with portions thereof having said attached groups.

17. A humidity sensitive element as described in claim 2, said chemical bond being maintained in the presence of water.

18. A humidity sensitive element as described in claim 12, said chemical bond being maintained in the presence of water.

References Cited in the file of this patent

UNITED STATES PATENTS

| | | |
|---|---|---|
| 2,285,421 | Dunmore | June 9, 1942 |
| 2,295,570 | Dunmore | Sept. 15, 1942 |
| 2,377,426 | Kersten | June 5, 1945 |
| 2,400,720 | Staudinger et al. | May 21, 1946 |
| 2,424,735 | Boothroyd | July 29, 1947 |
| 2,435,895 | McIlvaine | Feb. 10, 1948 |
| 2,446,536 | Hardy | Aug. 10, 1948 |
| 2,466,675 | Bauman | Apr. 12, 1949 |
| 2,500,149 | Boyer | Mar. 14, 1950 |
| 2,613,302 | Gurewitsch | Oct. 7, 1952 |

FOREIGN PATENTS

| | | |
|---|---|---|
| 645,946 | Great Britain | Nov. 15, 1950 |